(12) United States Patent
Janssens

(10) Patent No.: US 7,954,542 B2
(45) Date of Patent: Jun. 7, 2011

(54) HEAT EXCHANGER

(75) Inventor: Stijn Jozef Rita Johanna Janssens, Denderleeuw (BE)

(73) Assignee: Atlas Copco Airpower, Wilrijk (BE)

( * ) Notice: Subject to any disclaimer, the term of this patent is extended or adjusted under 35 U.S.C. 154(b) by 673 days.

(21) Appl. No.: 10/586,595

(22) PCT Filed: Jan. 26, 2005

(86) PCT No.: PCT/BE2005/000009
§ 371 (c)(1),
(2), (4) Date: Jan. 18, 2007

(87) PCT Pub. No.: WO2005/075057
PCT Pub. Date: Aug. 18, 2005

(65) Prior Publication Data
US 2008/0277106 A1    Nov. 13, 2008

(30) Foreign Application Priority Data

Feb. 3, 2004    (BE) .................................. 2004/0053

(51) Int. Cl.
*F28B 3/00* (2006.01)
*F28B 9/10* (2006.01)
(52) U.S. Cl. ........................................ 165/114; 165/113
(58) Field of Classification Search .......... 165/110–117; 55/428, 428.1, 430, 431, 440
See application file for complete search history.

(56) References Cited

U.S. PATENT DOCUMENTS

| | | | | |
|---|---|---|---|---|
| 716,760 | A * | 12/1902 | Richmond | 165/114 |
| 947,393 | A * | 1/1910 | Muchaka | 55/440 |
| 1,935,822 | A * | 11/1933 | Smith | 165/114 |
| 2,252,242 | A * | 8/1941 | Wood | 96/334 |
| 2,276,277 | A * | 3/1942 | Waters | 96/189 |
| 2,782,150 | A * | 2/1957 | Stalcup | 202/185.5 |
| 2,921,647 | A * | 1/1960 | Pietrasz | 55/426 |
| 3,240,001 | A * | 3/1966 | Kuhn et al. | 55/392 |
| 3,698,476 | A * | 10/1972 | Wyzalek et al. | 165/112 |
| 3,925,040 | A * | 12/1975 | Fattinger | 96/356 |
| 3,953,183 | A * | 4/1976 | Regehr | 55/440 |
| 3,977,977 | A * | 8/1976 | Kall | 210/521 |
| 4,053,292 | A * | 10/1977 | Schneider et al. | 96/245 |
| 4,175,938 | A * | 11/1979 | Regehr et al. | 55/440 |
| 4,198,215 | A * | 4/1980 | Regehr | 55/440 |
| 4,598,767 | A * | 7/1986 | Saleh | 165/113 |
| 5,268,011 | A * | 12/1993 | Wurz | 55/440 |
| 5,983,996 | A * | 11/1999 | Romero | 165/111 |
| 6,868,695 | B1 * | 3/2005 | Dingel et al. | 62/515 |

FOREIGN PATENT DOCUMENTS

FR    2.181.469    12/1973

* cited by examiner

*Primary Examiner* — Tho v Duong
(74) *Attorney, Agent, or Firm* — Bacon & Thomas, PLLC

(57) ABSTRACT

Heat exchanger which mainly consists of a housing with a bottom, an upper wall and side walls, whereby onto two pairs of opposite side walls, the front wall and the back wall respectively, are connected a supply and a discharge for the gas to be cooled, and whereby channels are provided in the housing, according two cross directions, characterized in that, between the above-mentioned channels and the above-mentioned back wall, means are provided for separating condensate from the cooled gas.

7 Claims, 2 Drawing Sheets

HEAT EXCHANGER

BACKGROUND

A. Field

The present invention concerns a heat exchanger, more particularly a heat exchanger for gases, which is provided with means for separating condensate from a cooled gas.

B. Related Art

Devices for cooling gases are already known which are provided with means for separating condensate from a cooled gas, whereby these means are externally provided in relation to the heat exchanger and consist, for example, of a water separator of what is called the cyclone type, which, is built up of a cylinder-shaped housing.

By letting the cooled air flow tangentially in the cylinder-shaped condensate separator, the air and, the drops of condensate situated therein are subjected to a centrifugal force which makes it possible to remove the drops of condensate from the air flow.

A disadvantage of such a known heat exchanger with an external condensate separator consists in that relatively large load differences are created over a known condensate separator of the cyclone type, which means in a concrete manner that this known condensate separator absorbs relatively much energy from the air flow, so that extra pumps or compression steps may have to be provided behind such a condensate separator in order to build the required air pressure and the necessary air output up again, which results in relatively high operational costs for this known condensate separator.

Other known condensate separators which are externally applied behind a heat exchanger separate the condensate from the air flow by means of the gravitational force as is for example the case in U.S. Pat. No. 5,268,011.

A disadvantage of such known condensate separators is that they do not work efficiently at high flow rates of the air to be treated, since in that case the drops of condensate are sucked along by the air flow. As a result, such a known condensate separator must be made relatively large in order to be able to process a preset air output, at a low flow rate of the air to be treated, which is disadvantageous in that the cost price of such a large condensate separator is relatively high.

SUMMARY OF THE DISCLOSURE

The present invention aims to remedy one or several of the above-mentioned disadvantages.

To this end, the invention concerns a heat exchanger which mainly consists of a housing with a bottom, an upper wall and side walls, whereby on two pairs of opposite side walls, the front wall and the back wall respectively, a supply and a discharge for the gas to be cooled are connected and whereby means are provided in the housing for separating condensate from the cooled gas which are mainly formed of a series of corrugated vertical walls upon which are provided crosswise extending ribs forming vertical gutters extending from the bottom up to the upper wall of the housing, characterised in that holes are provided in the bottom for the discharge of the separated condensate from the gutters via a collector, which collector extends from at least under the holes to under an opening which is provided in the bottom between the means for separating condensate and the back wall.

An advantage of the heat exchanger according to the invention is that the means for separating condensate are provided in the same housing as the heat exchanger, such that providing a heat exchanger according to the invention, for example at the compressed air outlet of a compressor, can be done in a relatively fast and simple manner.

Another advantage of a heat exchanger according to the invention, is that it can be made relatively compact and can be manufactured in a relatively cheap manner.

Moreover, it is possible to realise a high separation efficiency, combined with a low load loss, and the extra load loss which would normally occur between the connection of the heat exchanger to the condensate separator is by-passed when the heat exchanger and the condensate separator are connected to each other as two separate parts.

DESCRIPTION OF THE DRAWINGS

In order to better explain the characteristics of the present invention, the following preferred embodiment of a heat exchanger according to the invention is described as an example only without being limitative in any way, with reference to the accompanying drawings, in which.

DETAILED DESCRIPTION OF PREFERRED EMBODIMENTS OF THE INVENTION

Figure 1:
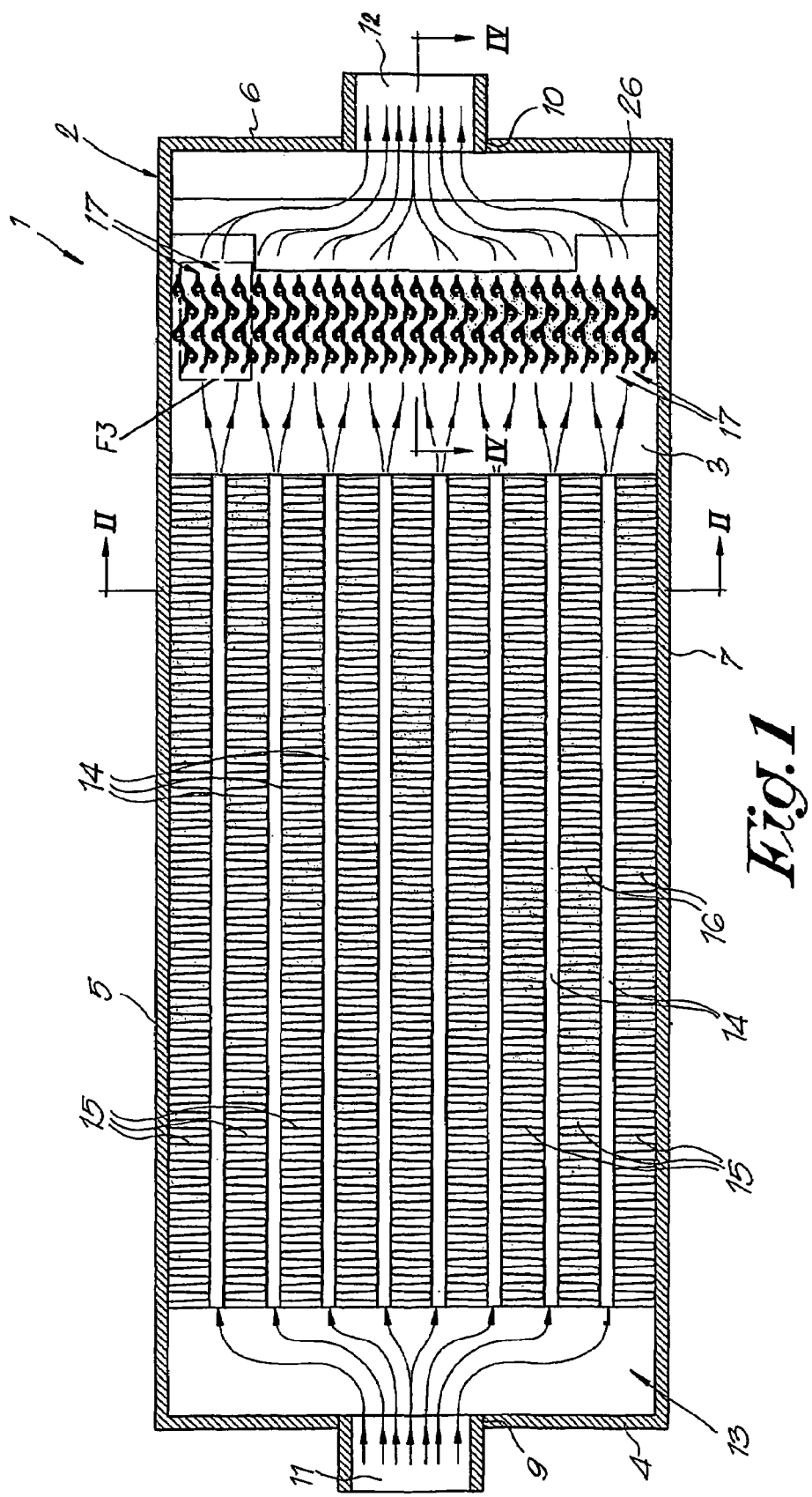
FIG. 1 schematically represents a heat exchanger according to the invention as a section.
Figure 2:
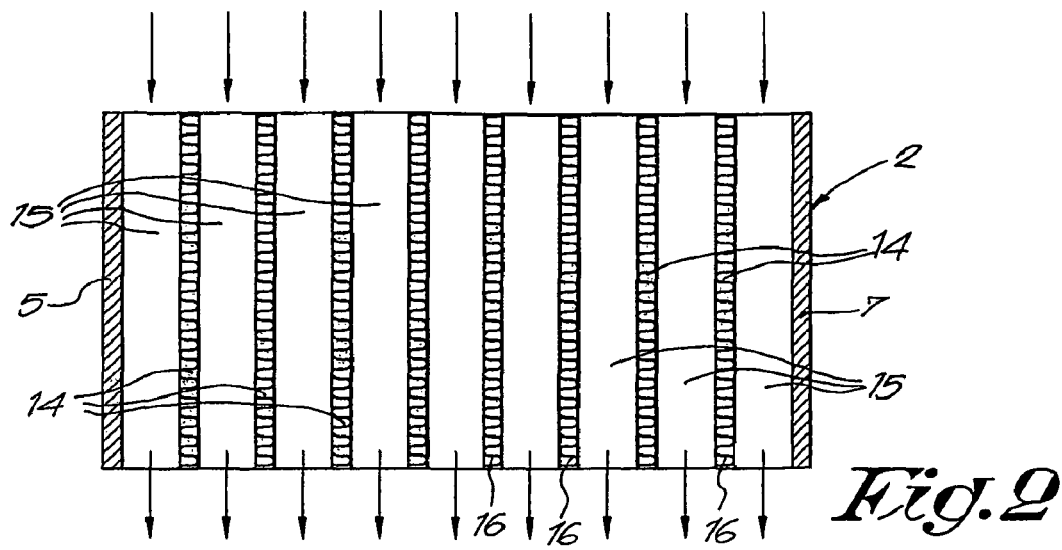
FIG. 2 represents a section according to line II-II in FIG. 1.
Figure 4:
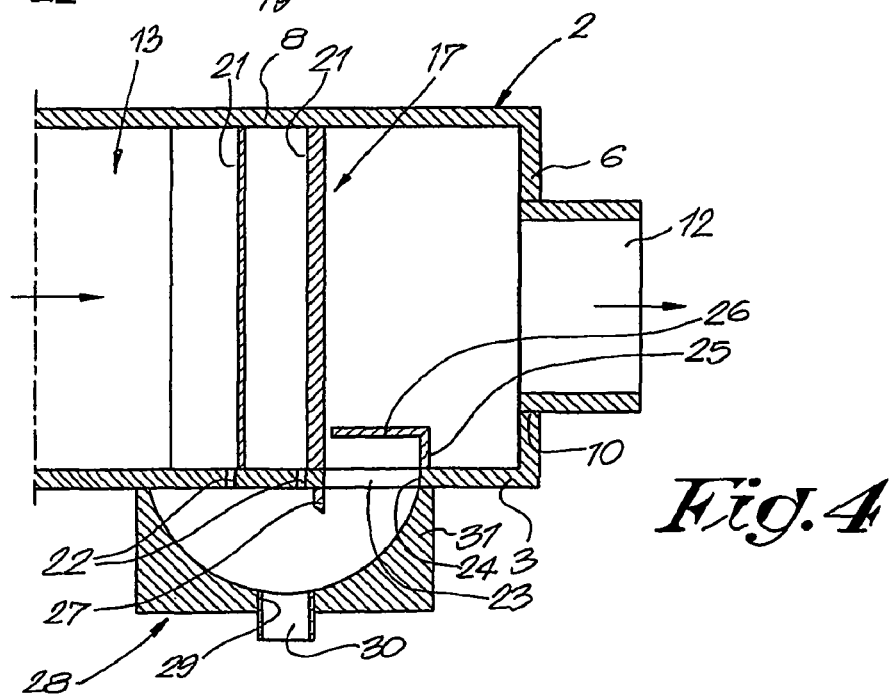
FIG. 4 represents a section according to line IV-IV in FIG. 1 to a larger scale.

FIG. 1 represents a heat exchanger 1 which mainly consists of a housing 2, formed of a bottom 3 and side walls 4 to 7 which, as is represented in FIG. 4, support an upper wall 8.

In two opposite side walls, which are indicated here as the front wall 4 and the back wall 6 for simplicity's sake, are provided passages 9 and 10, through which a supply 11 for the gas to be cooled and a discharge 12 for the cooled gas connect to the space 13 in the housing 2.

In the above-mentioned space 13 are provided channels 14 and 15 in the known manner according to two cross directions, whereby in each of the different channels 14-15, as is known, are provided corrugated plates 16.

According to the invention, means are provided between the above-mentioned channels 14 and the back wall 6, which make it possible to separate condensate from the cooled gas.

Figure 3:
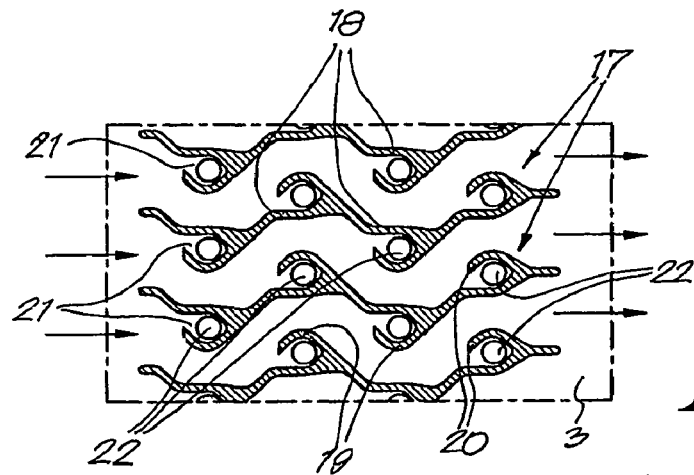
FIG. 3 represents the part indicated by F3 in FIG. 1 to a larger scale.

As is represented in FIG. 3 to a larger scale, these means in this case consist of a number of corrugated vertical walls 17, provided on the bottom 3 of the housing 2, and which extend up to the upper wall 8 of this housing 2.

On each of these walls 17 are provided, preferably along the outside of the different U-shaped bent parts 18, ribs 19 extending crosswise, which extend from the bottom 3 up to the upper wall 8 of the housing 2, and which are folded back at their free end 20 towards the front wall 4, so that a vertical gutter 21 is each time created.

In the different gutters 21 are provided holes 22, in the bottom 3 of the housing 2.

As is represented in FIG. 4, an opening 23 is provided between the above-described means for separating condensate and the above-mentioned back wall 6, in the bottom 3 of the housing 2.

On the side edge 24 of said opening 23, on the side of the above-mentioned back wall 6, is provided a crosswise standing rib 25 which is provided with a cross edge 26 on its free end which extends over practically the entire opening 23.

As is represented in FIG. 1, this cross edge 26 near the side walls 5 and 7 is preferably made considerably shorter than around the centre of the housing 2, as a result of which the edge 26 extends less far over the opening 23 in the vicinity of the side walls 5 and 7 than elsewhere in the housing 2.

As is represented in FIG. 4, between the holes 22 and the above-mentioned opening 23, below the bottom 3 of the housing 2, is provided a crosswise extending edge 27.

Below the housing 2 is provided a collector 28 for water which extends at least from under the different holes 22 to under the opening 23, whereby a passage 29 is provided at the bottom of the collector 28 through which is fixed a discharge pipe 30 for condensate.

The above-mentioned collector 28 is preferably made U-shaped, whereby the leg 31 of the collector 28 which is situated closest to the back wall 6 of the heat exchanger 1 is connected to the above-mentioned side edge 24 of the opening 23.

The working of the above-described heat exchanger according to the invention is simple and as follows.

The heat exchanger 1 according to the invention is designed for example to cool hot air coming from a compressor.

To this end, the hot air is guided via the supply 11 through the channels 14 and between the plates 16 of the heat exchanger 1, whereby the hot air, in the known manner, indirectly renders part of its heat to a cooling medium, such as for example cold air or water, which is pumped or propelled through the channels 15.

By cooling the hot air to the saturation point, part of the water or the like which is present in the hot air, is condensed and carried along in the air flow, through the channels 14, in the shape of small drops.

When the cooled, damp air is subsequently guided between the corrugated walls 17 of the means which make it possible to separate condensate from the cooled gas, the available drops of condensate, when the rate of flow of the damp air is sufficiently high, will be collected in the vertical gutters 21 as a result of what is called the principle of inertia.

The collected drops of condensate will then be discharged, under the influence of the force of gravity, through the holes 22 in the bottom 3 of the housing 2 via the above-mentioned collector 28, through the passage 29 in the discharge pipe 30 for the condensate.

Since, through the above-mentioned holes 22 in the bottom 3, also a part of the cooled air escapes from the heat exchanger 1, the opening 23 is provided, which allows the escaped air to flow back into the heat exchanger 1, which is promoted by the U-shaped construction of the collector 28.

The standing rib 25 and the cross edge 26 provided on it make sure that drops of condensate from the collector are not carried along with the air flow which is available there, through the above-mentioned opening 23.

The standing rib 25 also makes sure that the condensate film, lying on the bottom 3 of the heat exchanger 1, is not blown away through the corrugated walls 17 to the discharge 12, as this rib 25 makes it possible to keep air speeds at the height of the condensate film low, giving the condensate film the chance to run off through the opening 23.

A disadvantage of providing the above-mentioned cross edge 26 is that, in some cases, the air recycled via the opening 23 is insufficient. In order to remedy this disadvantage, the cross edge 26 near the side walls 5 and 7 of the housing 2, is made considerably shorter, such that less resistance is built up in the vicinity of the side walls 5 and 7 for the air flow through the opening 23.

The crosswise extending edge 27 below the bottom 3 between the holes 22 and the opening 23 prevents drops of condensate, which are discharged from the heat exchanger through the holes 22, from sticking against the lower side of the bottom 3 and from being carried back to the heat exchanger 1 with the air flow through the holes 22 and the opening 23.

Of course, it is possible to provide the above-described construction of a heat exchanger according to the invention several times in succession in one and the same housing 2, such that a gas to be cooled can successively be subjected to a first cooling, a first separation of condensate or moisture, a second cooling, a second moisture separation, etcetera, so that the gas does not have to be cooled to the required temperature straight away if this would result in too large amounts of condensate between the channels 14 in the heat exchanger 1, as a result of which the heat exchanger 1 might lose its efficiency.

The present invention is by no means limited to the above-described embodiment, given as an example and represented in the accompanying drawings; on the contrary, such a heat exchanger according to the invention can be made in all sorts of shapes and dimensions while still remaining within the scope of the invention.

The invention claimed is:

1. Heat exchanger, comprising a housing with a bottom, an upper wall and side walls, wherein onto two pairs of opposite side walls, the front wall and the back wall, respectively, are connected a supply and a discharge for a gas to be cooled and wherein means are provided in the housing for separating condensate from the cooled gas, comprising a series of corrugated vertical walls upon which are provided crosswise extending ribs forming vertical gutters extending only from the bottom up to the upper wall of the housing, and further wherein holes are provided in the bottom for the discharge of the separated condensate from the gutters via a collector, said collector extending from at least under the holes to under an opening which is provided in the bottom between the means for separating condensate and the back wall; and including a standing rib on the side edge of the opening, said standing rib having a cross edge on a free end thereof which extends over practically the entire opening and said cross edge, near the side walls of the housing, being shorter than near the center of the housing.

2. Heat exchanger according to claim 1, wherein said opening extends over the entire, or practically the entire width of the housing.

3. Heat exchanger according to claim 1, wherein the collector is formed U-shaped.

4. Heat exchanger according to claim 3, wherein the leg of the collector which is situated closest to the back wall, is connected to the side edge of the opening on the side of the back wall.

5. Heat exchanger according to claim 1, wherein between the means for separating condensate from the cooled gas and the opening, and below the bottom of the housing, a crosswise extending edge is provided.

6. Heat exchanger according to claim 1, wherein the ribs are folded back at their free ends to the front wall of the housing.

7. Heat exchanger according to claim 1, wherein each of the ribs is provided on the outside of a U-shaped bent part of the corrugated walls.

* * * * *